United States Patent
Kota

(10) Patent No.: US 10,049,132 B2
(45) Date of Patent: Aug. 14, 2018

(54) PERSONALIZING QUERY REWRITES FOR AD MATCHING

(71) Applicant: Excalibur IP, LLC, New York, NY (US)

(72) Inventor: Nagaraj Kota, Bangalore (IN)

(73) Assignee: Excalibur IP, LLC, New York, NY (US)

(*) Notice: Subject to any disclaimer, the term of this patent is extended or adjusted under 35 U.S.C. 154(b) by 511 days.

(21) Appl. No.: 14/315,968

(22) Filed: Jun. 26, 2014

(65) Prior Publication Data

US 2015/0379079 A1 Dec. 31, 2015

(51) Int. Cl.
| | | |
|---|---|---|
| *G06F 7/00* | (2006.01) | |
| *G06F 17/30* | (2006.01) | |
| *G06Q 30/02* | (2012.01) | |

(52) U.S. Cl.
CPC .. *G06F 17/30448* (2013.01); *G06F 17/30864* (2013.01); *G06Q 30/0277* (2013.01)

(58) Field of Classification Search
None
See application file for complete search history.

(56) References Cited

U.S. PATENT DOCUMENTS

| | | | | |
|---|---|---|---|---|
| 7,945,565 | B2* | 5/2011 | Poblete | G06F 17/30867 707/722 |
| 8,290,975 | B2* | 10/2012 | Gao | G06F 17/3064 707/705 |
| 8,356,035 | B1* | 1/2013 | Baluja | G06F 17/30247 707/741 |
| 2005/0278368 | A1* | 12/2005 | Benedikt | G06F 17/30914 |
| 2009/0119261 | A1* | 5/2009 | Ismalon | G06F 17/3064 |
| 2009/0138356 | A1* | 5/2009 | Pomplun | G06F 17/30864 705/14.69 |
| 2011/0184893 | A1* | 7/2011 | Paparizos | G06F 17/30525 706/12 |
| 2012/0136722 | A1* | 5/2012 | Kothiwal | G06Q 30/0256 705/14.54 |
| 2015/0363461 | A1* | 12/2015 | Behal | G06F 17/30424 707/722 |

OTHER PUBLICATIONS

Rosie Jones;Generating Query Substitutions; ACM; 2006; pp. 387-396.*

\* cited by examiner

*Primary Examiner* — Mariela Reyes
*Assistant Examiner* — Jermaine Mincey
(74) *Attorney, Agent, or Firm* — Brinks Gilson & Lione

(57) ABSTRACT

Systems and methods for rewriting queries based on data features are disclosed. A data source contains a history of queries and results associated with the queries. A source query is received and a subset of the data source is extracted that is related to the query. Costs are then associated with the associations of the queries and results, and an absorbed cost is determined for each query. The queries having the lowest absorbed cost are recommended for rewrites.

15 Claims, 4 Drawing Sheets

PERSONALIZING QUERY REWRITES FOR AD MATCHING

BACKGROUND

1. Technical Field

The disclosed embodiments are related to internet advertising and more particularly to systems and method for rewriting queries in a search ad marketplace.

2. Background

Internet advertising is a multi-billion dollar industry and is growing at double digit rates in recent years. It is also the major revenue source for internet companies such as Yahoo!® that provide advertising networks that connect advertisers, publishers, and Internet users. As an intermediary, these companies are also referred to as advertiser brokers or providers. New and creative ways to attract attention of users to advertisements ("ads") or to the sponsors of those advertisements help to grow the effectiveness of online advertising, and thus increase the growth of sponsored and organic advertising. Publishers partner with advertisers, or allow advertisements to be delivered to their web pages, to help pay for the published content, or for other marketing reasons.

Search engines assist users in finding content on the Internet. In the search ad marketplace, ads are displayed to a user alongside the results of a user's search. Ideally, the displayed ads will be of interest to the user resulting in the user clicking through an ad. In order to increase the likelihood of a user clicking through the ad, an ad may be selected for display by matching terms contained in the search with the ad. Such systems work well in many situations, but in other situations a limited number or even no ads may match the terms of the search. To combat this problem, query rewriting is often used to broaden the number of ads matched to the query terms. In query rewriting, the search terms are rewritten into related terms based on a goal such as relevance.

The traditional use of query rewrites has generally been successful in a desktop environment. However, other types of devices for accessing the Internet are growing more common. Such devices may have limited user interfaces or their usage models may vary compared to a desktop computer. It would be beneficial to rewrite queries that maximized the search ad marketplace for all devices.

BRIEF SUMMARY

Embodiments of the invention include a computing system for rewriting queries. The computer system includes a computer executed module configured to receive a source query and a feature, a computer executed module configured to extract a data subset from a data source based on the received source query, the data source comprising a plurality of results associated with the source query, a plurality of queries associated with the plurality of results, and a plurality of associations between the plurality of queries and the plurality of results, a computer executed module configured to associate a cost based on the feature with at least one association from among the plurality of associations, a computer executed module configured to determine a cost for at least one query from among the plurality of queries, and a computer executed module configured to recommend at least one query from among the data subset based on the determined cost of the plurality of queries. In some embodiments the feature may be a device type.

In some embodiments the feature comprises a device type. In some embodiments the results comprise uniform resource locators identifying a search result and the data source comprises a query-uniform resource locator graph having queries as nodes, uniform resource locators as nodes, and associations between queries and uniform resource locators as edges. In some embodiments each edge has a one-step transition probability modeled on click history.

In some embodiments the system further includes the data source storing information associating a plurality of queries and results, the associations being weighted based on historic click through data.

In some embodiments a cost associated with each edge from a query to a result is modeled as a function of a position normalized click through rate and a normalized probability of occurrence of the result for the feature. The function of position normalized click through rate and a normalized probability of occurrence of the result for the feature may be defined as $C(u|q)=1+\alpha*(1-nCTR)+\beta*(1-p\_u)$ with $C(u|q)$ defined as a cost of each edge from a query to a result, $\alpha$ is a weight for commerciability, nCTR is a normalized click through rate, $\beta$ is a weight associated with the feature, and p_u is the normalized probability of occurrence of the result for the feature. A cost associated with each edge from a result to a query may be modeled as a function of the normalized probability of occurrence of the query for the feature. The function of a cost associated with each edge from a result to a query may be defined as $C(q|u)=1+(1-p\_q)$ with $C(q|u)$ being the cost associated with each edge from a result to a query and p_q being the normalized probability of occurrence of the query for the feature. The computing system of claim 10, wherein the cost for at least one query from among the data subset is determined by a random walk on the query-result graph to determine an absorbed cost.

Another embodiment of the invention is directed to a computer implemented method. The method includes receiving a query and a feature at a computing system, accessing, by a computing system, a data store having a query-result graph, extracting, by a computer system, a sub graph related to the query from the query-result graph, associating, by a computing system, a cost for each edge of the sub graph, and determining, by a computing system, a cost for each node of the sub graph. Some embodiments further include outputting, by a computing system, at least one determined cost for a node of the sub graph. Some embodiments further include recommending, by a computer system, at least one node of the sub graph based on the determined cost of the nodes of the sub graph.

In some embodiments associating a cost for each edge of the sub graph may include modeling a cost for each edge from a query to a result as a function of a position normalized click through rate and a normalized probability of occurrence of the result for the feature and modeling a cost for each edge from a result to a query as a function of the normalized probability of occurrence of the query for the feature. The function of position normalized click through rate and the cost associated with each query may be defined as $C(u|q)=1+\alpha*(1-nCTR)+\beta*(1-p\_u)$ wherein $C(u|q)$ is defined as a cost of each edge from a query to a result, $\alpha$ is a weight for commerciability, nCTR is a normalized click through rate, $\beta$ is a weight associated with the feature, and p_u is the normalized probability of occurrence of the result for the feature, and wherein the function of a cost associated with each result is defined as $C(q|u)=1+(1-p\_q)$, wherein $C(q|u)$ is the cost associated with each edge from a result to a query and p_q is the normalized probability of occurrence of the query for the feature.

In some embodiments determining a cost for each node of the sub graph include performing a random walk on the sub graph to determine an absorbing cost for each node.

In some embodiments the method further includes determining, by a computing system, the probability of occurrence of a query from among the sub graph for the feature and the probability of occurrence of a result from among the sub graph for the feature.

Embodiments of the Invention Include the revenue metric.

DETAILED DESCRIPTION

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

By way of introduction, the disclosed embodiments relate to systems and methods for rewriting search queries. The systems and methods are able to rewrite a search query taking into account a user's type of device while maximizing commerciability. The systems and methods may also generate keywords for recommendation to advertisers.

Network

Figure 1:
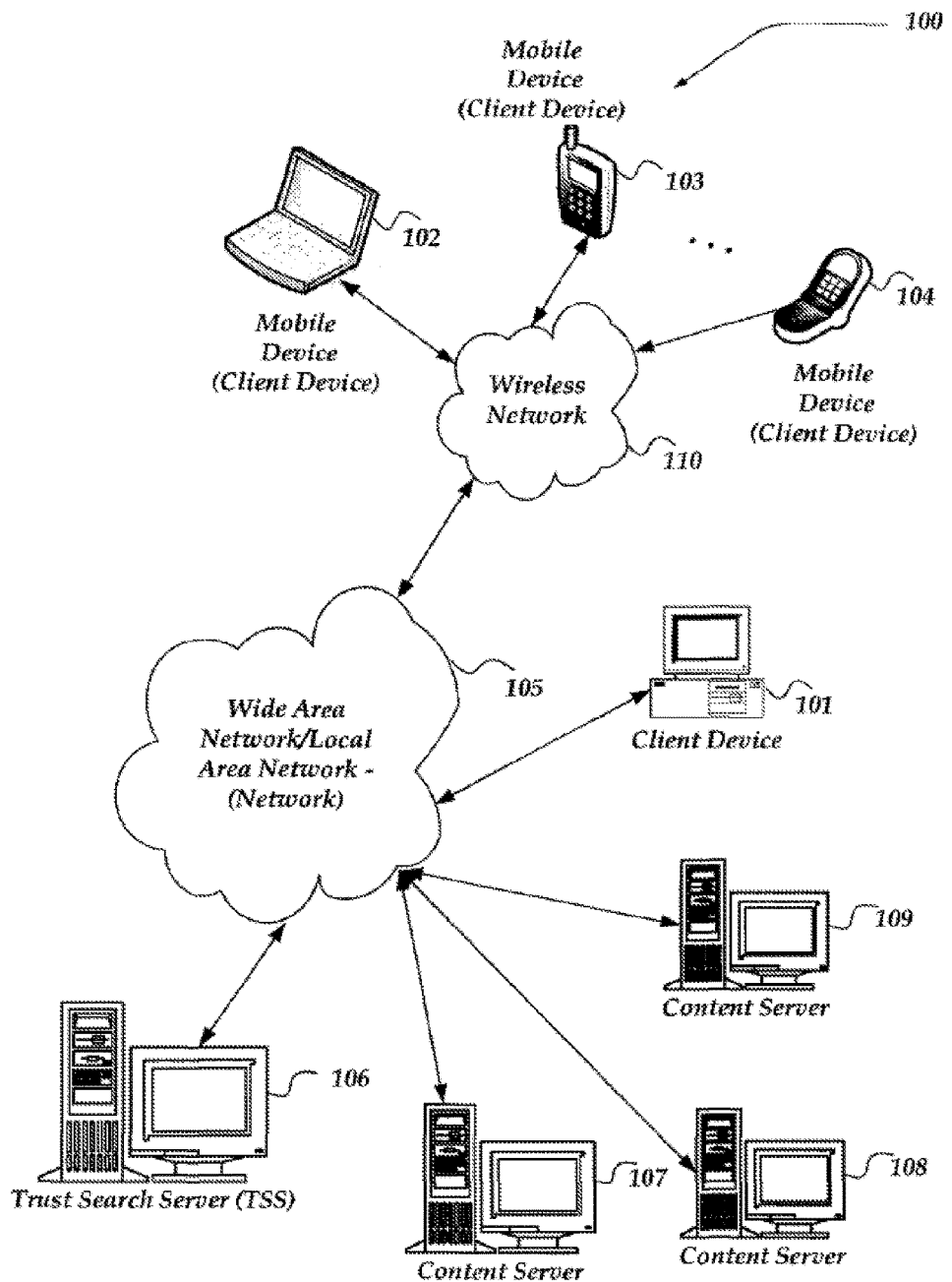
FIG. 1 illustrates an exemplary embodiment of a network system suitable for practicing the invention.

FIG. 1 is a schematic diagram illustrating an example embodiment of a network 100 suitable for practicing the claimed subject matter. Other embodiments may vary, for example, in terms of arrangement or in terms of type of components, and are also intended to be included within claimed subject matter. Furthermore, each component may be formed from multiple components. The example network 100 of FIG. 1 may include one or more networks, such as local area network (LAN)/wide area network (WAN) 105 and wireless network 110, interconnecting a variety of devices, such as client device 101, mobile devices 102, 103, and 104, servers 107, 108, and 109, and search server 106.

The network 100 may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

Computing Device

Figure 2:
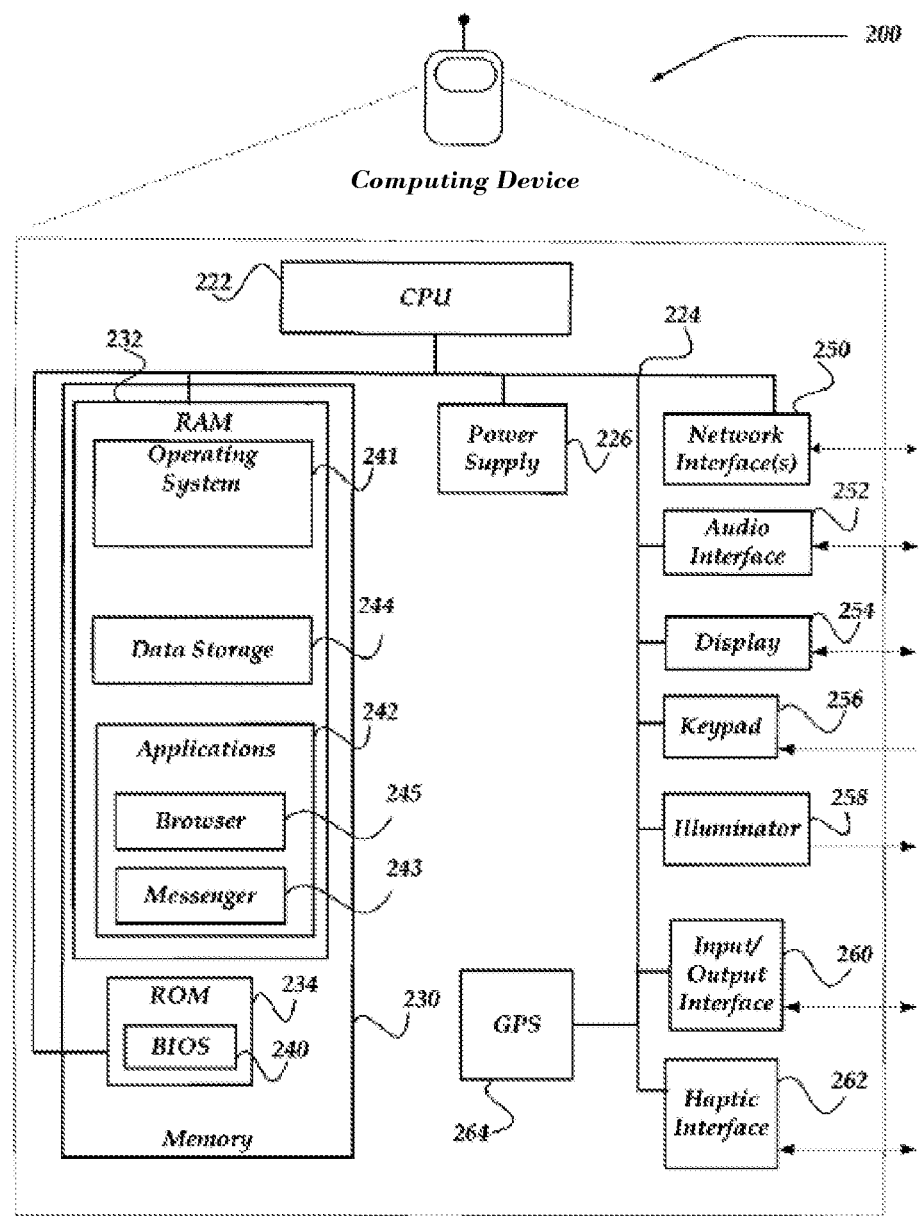
FIG. 2 illustrates a schematic of a computing device suitable for practicing the invention.

FIG. 2 shows one example schematic of an embodiment of a computing device 200 that may be used to practice the claimed subject matter. The computing device 200 includes a memory 230 that stores computer readable data. The memory 230 may include random access memory (RAM) 232 and read only memory (ROM) 234. The ROM 234 may include memory storing a basic input output system (BIOS) 230 for interfacing with the hardware of the client device 200. The RAM 232 may include an operating system 241, data storage 244, and applications 242 including a browser 245 and a messenger 243. A central processing unit (CPU) 222 executes computer instructions to implement functions. A power supply 226 supplies power to the memory 230, the CPU 222, and other components. The CPU 222, the memory 230, and other devices may be interconnected by a bus 224 operable to communicate between the different components.

The computing device 200 may further include components interconnected to the bus 224 such as a network interface 250 that provides an interface between the computing device 200 and a network, an audio interface 252 that provides auditory input and output with the computing device 200, a display 254 for displaying information, a keypad 256 for inputting information, an illuminator 258 for displaying visual indications, an input/output interface 260 for interfacing with other input/output devices, haptic feedback interface 262 for providing tactile feedback, and a global positioning system 264 for determining a geographical location.

Client Device

A client device is a computing device 200 used by a client and may be capable of sending or receiving signals via the wired or the wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

A client device may vary in terms of capabilities or features and need not contain all of the components described above in relation to a computing device. Similarly, a client device may have other components that were not previously described. Claimed subject matter is intended to cover a wide range of potential variations. For example, a cell phone may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages, such as via email, short message service (SMS), or multimedia message service (MMS), including via a network, such as a social network, including, for example, Facebook, LinkedIn, Twitter, Flickr, or Google+, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

Servers

A server is a computing device 200 that provides services. Servers vary in application and capabilities and need not contain all of the components of the exemplary computing device 200. Additionally, a server may contain additional components not shown in the exemplary computing device 200. In some embodiments a computing device 200 may operate as both a client device and a server.

Features of the claimed subject matter may be carried out by a content server. A content server may include a computing device 200 that includes a configuration to provide content via a network to another computing device. A content server may, for example, host a site, such as a social networking site, examples of which may include, without limitation, Flicker, Twitter, Facebook, LinkedIn, or a personal user site (such as a blog, vlog, online dating site, etc.). A content server may also host a variety of other sites, including, but not limited to business sites, educational sites, dictionary sites, encyclopedia sites, wikis, financial sites, government sites, etc. A content server may further provide a variety of services that include, but are not limited to, web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example. Examples of devices that may operate as a content server include desktop computers, multiprocessor systems, microprocessor-type or programmable consumer electronics, etc.

Searching

A search engine may enable a device, such as a client device, to search for files of interest using a search query. Typically, a search engine may be accessed by a client device via one or more servers. A search engine may, for example, in one illustrative embodiment, comprise a crawler component, an indexer component, an index storage component, a search component, a ranking component, a cache, a profile storage component, a logon component, a profile builder, and one or more application program interfaces (APIs). A search engine may be deployed in a distributed manner, such as via a set of distributed servers, for example. Components may be duplicated within a network, such as for redundancy or better access.

A crawler may be operable to communicate with a variety of content servers, typically via a network. In some embodiments, a crawler starts with a list of URLs to visit. The list is called the seed list. As the crawler visits the URLs in the seed list, it identifies all the hyperlinks in the page and adds them to a list of URLs to visit, called the crawl frontier. URLs from the crawler frontier are recursively visited according to a set of policies. A crawler typically retrieves files by generating a copy for storage, such as local cache storage. A cache refers to a persistent storage device. A crawler may likewise follow links, such as HTTP hyperlinks, in the retrieved file to additional files and may retrieve those files by generating copy for storage, and so forth. A crawler may therefore retrieve files from a plurality of content servers as it "crawls" across a network.

An indexer may be operable to generate an index of content, including associated contextual content, such as for one or more databases, which may be searched to locate content, including contextual content. An index may include index entries, wherein an index entry may be assigned a value referred to as a weight. An index entry may include a portion of the database. In some embodiments, an indexer may use an inverted index that stores a mapping from content to its locations in a database file, or in a document or a set of documents. A record level inverted index contains a list of references to documents for each word. A word level inverted index additionally contains the positions of each word within a document. A weight for an index entry may be assigned. For example, a weight may be assigned substantially in accordance with a difference between the number of records indexed without the index entry and the number of records indexed with the index entry.

The term "Boolean search engine" refers to a search engine capable of parsing Boolean-style syntax, such as may be used in a search query. A Boolean search engine may allow the use of Boolean operators (such as AND, OR, NOT, or XOR) to specify a logical relationship between search terms. For example, the search query "college OR university" may return results with "college," results with "university," or results with both, while the search query "college XOR university" may return results with "college" or results with "university," but not results with both.

In contrast to Boolean-style syntax, "semantic search" refers a search technique in which search results are evaluated for relevance based at least in part on contextual meaning associated with query search terms. In contrast with Boolean-style syntax to specify a relationship between search terms, a semantic search may attempt to infer a meaning for terms of a natural language search query. Semantic search may therefore employ "semantics" (e.g., science of meaning in language) to search repositories of various types of content.

Search results located during a search of an index performed in response to a search query submission may typically be ranked. An index may include entries with an index entry assigned a value referred to as a weight. A search query may comprise search query terms, wherein a query term may correspond to an index entry. In an embodiment, search results may be ranked by scoring located files or records, for example, such as in accordance with number of times a query term occurs weighed in accordance with a weight assigned to an index entry corresponding to the query term. Other aspects may also affect ranking, such as, for example, proximity of query terms within a located record or file, or semantic usage, for example. A score and an identifier for a located record or file, for example, may be stored in a respective entry of a ranking list. A list of search results may be ranked in accordance with scores, which may, for example, be provided in response to a search query. In some embodiments, machine-learned ranking (MLR) models are used to rank search results. MLR is a type of supervised or semi-supervised machine learning problem with the goal to automatically construct a ranking model from train.

Content within a repository of media or multimedia, for example, may be annotated. Examples of content may include text, images, audio, video, or the like, which may be processed in the form of physical signals, such as electrical signals, for example, or may be stored in memory, as physical states, for example. Content may be contained within an object, such as a Web object, Web page, Web site, electronic document, or the like. An item in a collection of content may be referred to as an "item of content" or a "content item," and may be retrieved from a "Web of Objects" comprising objects made up of a variety of types of content. The term "annotation," as used herein, refers to descriptive or contextual content related to a content item, for example, collected from an individual, such as a user, and stored in association with the individual or the content item Annotations may include various fields of descriptive content, such as a rating of a document, a list of keywords identifying topics of a document, etc.

Overview

Embodiments of the invention include systems and methods for rewriting queries based on desired features associated with a user. Past attempts to rewrite queries have focused on desktop search history without considering features such as device types and ad-clicks. By considering features such as device type and commercial intents, embodiments of the current invention are able to increase the amount of relevant ads retrieved. The increased number of ads and click through rates result in an improvement in click yield, increasing overall revenue per search for an ad broker. The methods and systems further allow an advertiser to tune his campaign to focus on potential customers, while reducing the number of ads shown to users unlikely to become a customer, making each ad more valuable.

The systems and methods are further capable of recommending other queries based on an operator's criteria. For example, instead of receiving a query from a user, a plurality of queries may be input by an operator. The operator would further input features that are desired targets. For example, if an operator were targeting customers at a specific time of day, the features to be considered could be the time of day and commerciability. The system would then be able to recommend the keywords having the lowest cost based on the features.

Figure 3:
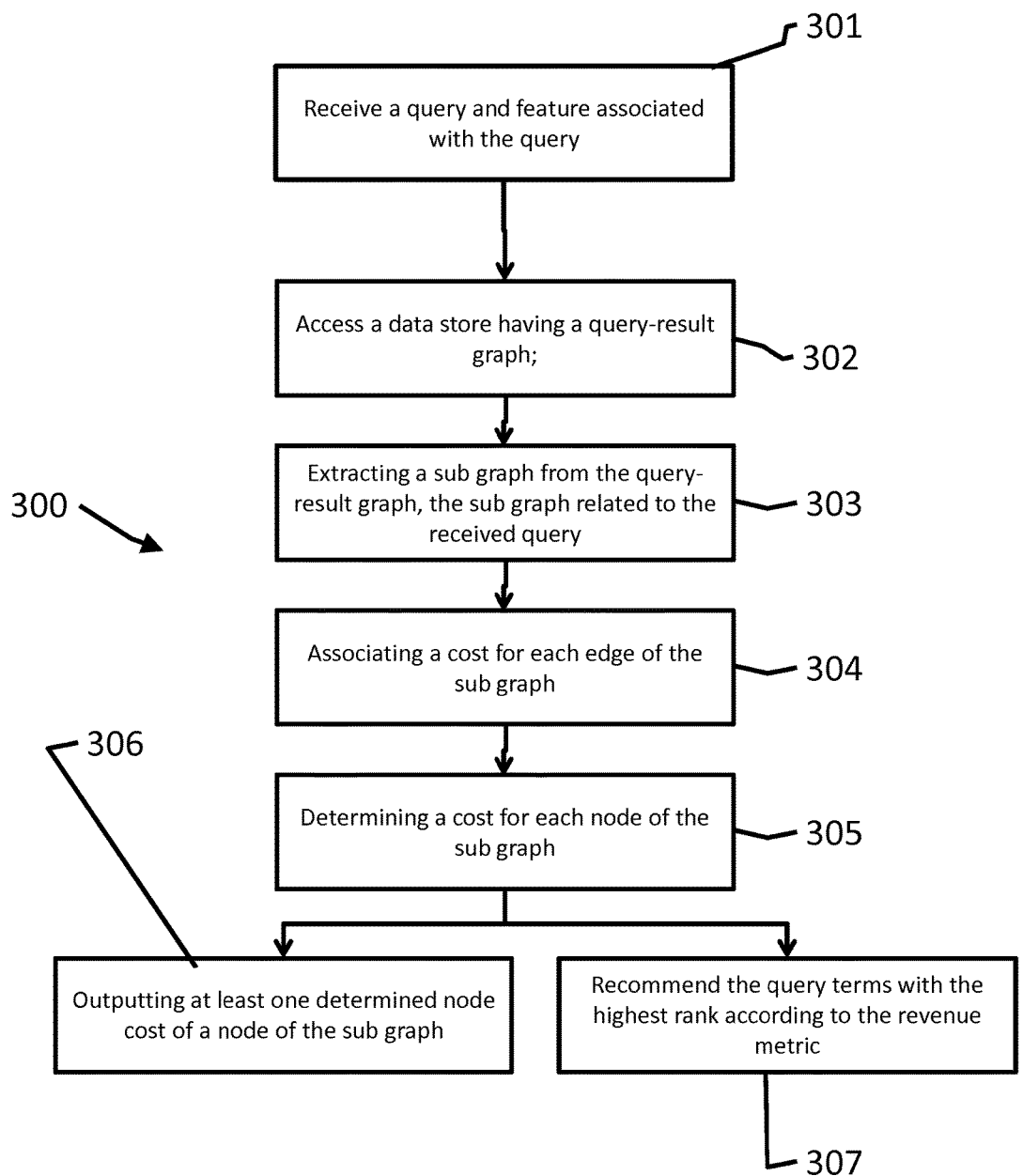
FIG. 3 illustrates a method of recommending queries based on short text documents.

FIG. 3 illustrates a high level flowchart of a method 300 for rewriting queries. The steps shown in the flowchart are carried out by a computing device, and each step may be performed by a separate software component of a computing device, or the execution of steps may be combined in one or more software components. The software components may exist on separate computing devices connected by a network, or they may exist on a single computing device. Computer executable instructions for causing the computing device to perform the steps may be stored on a non-transitory computer readable storage medium in communication with a processor.

In box 301 a source query and a feature associated with the query are received from a source. The query may originate from a user's client device and contain at least one term of interest to the user. The query may be received by a server or other computing device. For example, a user may enter a query into a user interface of a client device such as a web page. The client device may then transmit the query to a server over a network. The query may contain a single word for a search, a phrase, or a combination of words.

The feature is a characteristic for biasing the query rewrite. In one embodiment, the feature is the type of device that is requesting the query. In other embodiments, the feature may be the time of day, the date, or other characteristic.

In box 302 a data store is accessed. The data store may be internal to the computing device receiving the query, or in some embodiments the data store may be external to the computing device receiving the query. The data store includes data linking queries and results. The data may be in the form of a graph having queries as nodes, results as nodes, and linking information as edges between the query nodes and the result nodes. In one embodiment the linking information may be weighted as a one-step transition probability between the nodes based on historic click through data. In other embodiments the edge weights may be derived from other metrics such as dwell time or mutual click information. In still other embodiments any metric that may be converted into a probability distribution per node of the graph may be used as an edge weight. The results may be in the form of uniform resource locators (URLs) that identify an object such as an advertisement, web page, image, or other media.

The data store may be derived from past search queries and results stored in a search log. For example, a query term Q1 could return results R1, R2, and R3, having edges E1, E2, and E3. The frequency at which a user clicks on each result would be stored as an edge weight between Q1 and R1, R2, and R3. Other queries may also lead to the same results. For example, Q2 and Q3 may also lead to R1 in addition to Q1. Thus, additional edges E4 and E5 edge would be associated between Q2 and R1 and Q3 and R1 respectively. E4 may be weighted with the probability of a user clicking on R1 in response to Q2. Similarly E5 may be weighted with the probability of a user clicking on R1 in response to Q3.

Q2 and Q3 may also have results other than R1. For example, Q2 may have results R4 and R5, and Q3 may have results R6 and R7. The corresponding edges may be E6, E7, E8, and E9. Similarly, R6 may be associated with Q4, and Q5. This process of association may continue for each query logged and the results to the query.

In box 303 a sub graph is extracted from the data store. In one embodiment, the sub graph includes only those nodes that are within four steps of the source query. For example, the sub graph would contain a first level of results associated with the query, a first level of queries associated with the first level of results, a second level of results associated with the first level of queries, and a second level of queries associated with the second level of results. In other embodiments the sub graph may include more than four steps. For example, the sub graph may further include the third level of results associated with the second level of queries and the third level of queries associated with the third level of results.

In box 304 a cost is associated with each edge of the sub graph. The cost is orthogonal to the edge weight. The cost may be modeled based on any feature that is of interest and that may be modeled. The costs may generally be derived from information contained in the search log. For example, a search log may contain information such as devices initiating a query, the time and date of a query, click through results based on device types, and click through results based on time and date.

In one embodiment, the cost of stepping from a query to a result is modeled as a function of a position normalized click through rate and the probability of the result being associated with the feature. The position normalized click through rate represents the commerciability of the result. A result that represents an advertisement likely to clicked through has a greater commercial value than an advertisement that is less likely to be clicked through. A result that does not represent an advertisement would have a click through rate of zero. The probability of the result being associated with the feature represents a bias for a specific device type. For example, users of mobile devices may be more likely to click on videos, images, and summary results relative to more complex websites. Therefore results having these characteristics may have a higher probability of occurrence for a mobile device. These probabilities can be determined by analysis of search logs.

The cost of stepping from a result to a feature is modeled as a function of the normalized probability of occurrence of the query for the feature. For example, a user of a mobile device may be more likely to search for a restaurant than would a user of a desktop computer. Therefore, the restaurant query may have a high probability of occurrence for a mobile device than for a desktop computer.

In one embodiment the function of a position normalized click through rate and the probability of the result being associated with the feature is defined as $C(u|q)=1+\alpha*(1-nCTR)+\beta*(1-p\_u)$ when the wherein $C(u|q)$ is defined as a cost of each edge from a query to a result, a is a weight for commerciability, nCTR is a normalized click through rate, $\beta$ is a weight associated with the feature, and p_u is the normalized probability of occurrence of the result for the feature. The weights $\alpha$ and $\beta$ may be selected such that their sum is equal to one. More parameter and weights are possible and may be selected such that the weights are always cumulative to one. The function of a cost associated with each result is defined as $C(q|u)=1+(1-p\_q)$, wherein $C(q|u)$ is the cost associated with each edge from a result to a query and p_q is the normalized probability of occurrence of the query for the feature.

In box 305 a cost is determined for each node. The determined cost is dependent upon the edge weights and the costs assigned to the stepping between queries and results. The cost may be estimated by iteratively performing a random walk over the sub graph and calculating the absorbed cost for each node. The absorbed cost is an extension to a hitting time of a query for each node. Hitting time is defined as the expected number of steps needed to reach the source query from any node in the graph during a random walk. Each step taken during the random walk is cumulative and can be viewed as adding a cost of one to the total hitting time for each step.

The absorbed cost is similar to the hitting time, with the exception that the each step has a variable cost instead of a fixed increment. A step having a lower cost is preferable to a step having a higher cost. For example, based on the previous embodiment of a position normalized click through rate and the probability of the result being associated with the feature being defined as $C(u|q)=1+\alpha*(1-nCTR)+\beta*(1-p\_u)$, when the nCTR is 0 and the value of p_u is zero, the cost of stepping from a result to a query would be 2. This would be the maximum cost associated with the step. When the nCTR is 1 and the p_u is 1, the cost of stepping from a result to a query would be 1, which would be the minimum cost associated with stepping from a result to a query. Paths that have a lower cumulative cost are preferable to paths having a higher cumulative cost.

In box 306, at least one determined cost for a node of the sub graph may be output. For example, the determined costs for each of the related query terms may be output. Alternatively, in box 307, at least one node is recommended based on the determined cost. For example, the node with the lowest determined cost may be output or the nodes having the lowest cost may be output. In some embodiments the nodes having the lowest cost may be output along with the determined costs of the nodes.

Figure 4:
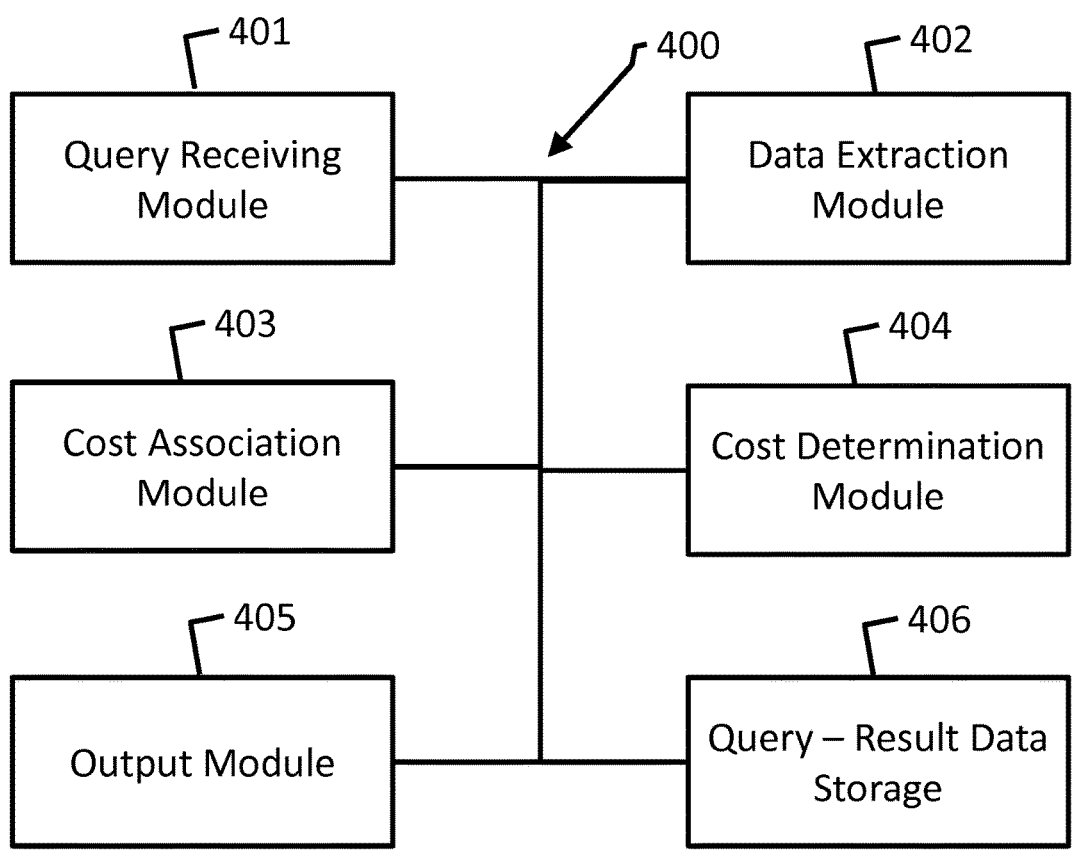
FIG. 4 illustrates a system for recommending queries based on short text documents.

FIG. 4 illustrates a schematic of a system 400 for rewriting queries. The system 400 may be executed as hardware or software modules on a computing device as shown in FIG. 2, or as a combination of hardware and software modules. The modules may be executable on a single computing device or a combination of modules may each be executable on separate computing devices interconnected by a network. FIG. 4 illustrates the system 400 as each component being connected by a common communication channel, but it need not be. For example, the different components may connect directly to another component and skip the common communication channel. The system 400 may utilize steps of the method 300 described previously in performing the function of each module.

The system includes a computer executed module 401 configured to receive a query and a feature. The computer executed module may receive the query over a network, or it may receive the query locally in some embodiments. The feature may be received with the query, or in some embodiments the feature could be received separate from the query. For example, a feature such as a device type could be received with the query whereas a feature such as commerciability may be received as an operator input to the system 400.

Computer executed module 402 is configured to extract a data subset from a data source 406 based on the received source query. The data source 406 includes a plurality of results associated with the source query, a plurality of queries associated with the plurality of results, and a plurality of associations between the plurality of queries and the plurality of results. The data source 400 may be a graph built based upon a search log with queries and nodes as results, and the associations being edges of the graph. The edges may be weighted based on historic click data in the search log. The data source 406 may be a component of the system 400 as shown in FIG. 4, or it may be a separate component accessed by the system to extract the sub graph.

Computer executed module 403 is configured to associate a cost based on the plurality of query features with at least one association from among the plurality of associations. The cost associated with each association may be modeled as described previously in relation to box 304 of the method for rewriting queries.

Computer executed module 404 is configured to determine a cost for at least one query from among the plurality of queries of the data subset based on the query, the data subset, and the features. The cost may be determined by doing an iterative random walk on the data subset to determine a cost of absorbing the source query into each node.

Computer executed module 405 is configured to output at least one query from among the data subset based on the determined cost of the plurality of queries. The system may output the query to an advertisement system for the selection of an advertisement to display to the user. The advertisement system may be a separate system or it may be integrated into the system for rewriting queries. In some embodiments, the system 400 may be used to recommend queries to an advertiser, in which case the system 400 may output queries to a user interface for display to an advertiser.

While various embodiments have been described above, it should be understood that they have been presented by way of example only, and not limitation. It will be apparent to persons skilled in the relevant arts) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

The invention claimed is:

1. A computing system for rewriting queries, comprising:
a computer executed module, when executed by a processor of the computing system, configured to receive, from a device configured to communicate with a search engine, a source query and features associated with the source query, the features including a device type of the device;
a computer executed module, when executed by the processor, configured to:
generate a data tree from historical search queries and results stored in a search log, wherein the data tree is generated in a data tree structure comprised of a root node including the source query and at least three node levels extending from the root node, wherein the at least three node levels include: a first result level comprised of first result nodes including results corresponding to the source query, a first query level comprised of first query nodes including queries corresponding to the results included in the first result nodes, a second result level comprised of second result nodes including results corresponding to the queries included in the first query nodes, and linking edges configured to link a result node with a query node from different node levels, wherein the data tree is generated in the data tree structure for accessing a representative subset of information from the historical search queries and results and including relationship information via the linking edges;
store the data tree in a database;
access, from the database, the data tree; and
extract, from the data tree, a data subset based on the root node representing the source query, wherein the data subset includes a predetermined number of node levels extending from the root node, wherein each node level includes a subset query node, a subset result node, and a subset linking node linking the subset query node with the subset result node;
a computer executed module, when executed by the processor, configured to assign a cost to at least one linking edge included in the data subset, the cost being based on the features associated with the source query;
a computer executed module, when executed by the processor, configured to determine a cumulative cost for each subset query node in the data subset; and
a computer executed module, when executed by the processor, configured to recommend a selected query node from among the subset query nodes included in the data subset based on the cumulative cost of the plurality of subset query nodes.

2. The computer system of claim 1, wherein the database is configured to store association information associating a plurality of queries and results, the association information including weights based on historic click through data.

3. The computing system of claim 1, wherein the result nodes comprise uniform resource locators identifying a search result; and
wherein the query nodes comprise queries.

4. The computing system of claim 3, wherein each linking edge has a one-step transition probability modeled on click history.

5. The computing system of claim 3, wherein a cost associated with each linking edge from a query node to a result node is modeled as a function of a position normalized click through rate and a normalized probability of occurrence of a result represented by the result node for the features.

6. The computing system of claim 5, wherein the function of the position normalized click through rate and a normalized probability of occurrence of the result for the features is defined as $$C(u|q) = 1 + \alpha*(1 - nCTR) + \beta*(1 - p\_u)$$

wherein $C(u|q)$ is defined as a cost of each linking edge from a query node to a result node, $\alpha$ is a weight for commerciability, $nCTR$ is a normalized click through rate, $\beta$ is a weight associated with the features, and p_u is the normalized probability of occurrence of the result for the features.

7. The computing system of claim 5, wherein a cost associated with each linking edge from a result node to a query node is modeled as a function of the normalized probability of occurrence of a query represented by the query node for the features.

8. The computing system of claim 7, wherein the function of a cost associated with each linking edge from a result node to a query node is defined as $$C(q|u)=1+(1-p\_q)$$

wherein C(q|u) is the cost associated with each linking edge from a result node to a query node and p_q is the normalized probability of occurrence of the query for the features.

9. The computing system of claim 8, wherein the cost for at least one query node from among the data subset is determined by a random walk on the data tree to find an absorbed cost.

10. A computer implemented method, comprising:
receiving, from a device configured to communicate with a search engine, a source query and features associated with the source query, the features including a device type of the device, at a computing system;
generating a data tree from historical search queries and results stored in a search log, wherein the data tree is generated in a data tree structure comprised of a root node including the source query and at least three node levels extending from the root node, wherein the at least three node levels include: a first result level comprised of first result nodes including results corresponding to the source query, a first query level comprised of first query nodes including queries corresponding to the results included in the first result nodes, a second result level comprised of second result nodes including results corresponding to the queries included in the first query nodes, and linking edges configured to link a result node with a query node from different node levels, wherein the data tree is generated in the data tree structure for accessing a representative subset of information from the historical search queries and results and including relationship information via the linking edges;
storing the data tree in a database;
accessing, by the computing system and from the database, the data tree;
extracting, by the computer system and from the data tree, a data subset based on the root node representing the source query, wherein the data subset includes a predetermined number of node levels extending from the root node, wherein each node level includes a subset query node, a subset result node, and a subset linking node linking the subset query node with the subset result node;
assigning, by the computing system, a cost to at least one linking edge included in the data subset, the cost being based on the features associated with the source query; and
determining, by the computing system, a cumulative cost for each subset query node in the data subset; and
recommending a selected query node from among the subset query nodes included in the data subset based on the cumulative cost of the plurality of subset query nodes.

11. The computer implement method of claim 10, further comprising outputting, by the computing system, at least one determined cost for a node of the data subset.

12. The computer implemented method of claim 10, wherein assigning the cost comprises modeling a cost for each linking edge from a query node to a result node as a function of a position normalized click through rate and a normalized probability of occurrence of a result represented by the result node for the features and modeling a cost for each linking edge from a result node to a query node as a function of the normalized probability of occurrence of a query represented by the query node for the features.

13. The computer implemented method of claim 12, wherein the function of the position normalized click through rate and the cost associated with each query is defined as $C(u|q)=1+\alpha*(1-nCTR)+\beta*(1-p\_u)$ wherein C(u|q) is defined as a cost of each linking edge from a query node to a result node, $\alpha$ is a weight for commerciability, nCTR is a normalized click through rate, $\beta$ is a weight associated with the features, and p_u is the normalized probability of occurrence of the result for the features, and wherein the function of a cost associated with each result is defined as $C(q|u)=1+(1-p\_q)$, wherein C(q|u) is the cost associated with each linking edge from a result node to a query node and p_q is the normalized probability of occurrence of the query for the features.

14. The method of claim 13, wherein determining a cumulative cost for each node of the data subset comprises performing a random walk on the sub graph to determine an absorbing cost for each node.

15. The method of claim 14, further comprising determining, by a computing system, the probability of occurrence of a query represented by a query node from among the data subset for the features and the probability of occurrence of a result represented by a result node from among the data subset for the features.

* * * * *